(12) United States Patent
Nakano et al.

(10) Patent No.: US 7,897,657 B2
(45) Date of Patent: Mar. 1, 2011

(54) INKJET INK FOR POLYVINYL CHLORIDE RESIN SHEET

(75) Inventors: Kaori Nakano, Tokyo (JP); Seiji Aida, Tokyo (JP); Ken Yamasaki, Tokyo (JP); Eriko Seki, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 553 days.

(21) Appl. No.: 11/917,200

(22) PCT Filed: Jun. 13, 2006

(86) PCT No.: PCT/JP2006/311846

§ 371 (c)(1),
(2), (4) Date: Dec. 12, 2007

(87) PCT Pub. No.: WO2006/134924

PCT Pub. Date: Dec. 21, 2006

(65) Prior Publication Data

US 2009/0118418 A1  May 7, 2009

(30) Foreign Application Priority Data

Jun. 14, 2005 (JP) .............................. 2005-173539

(51) Int. Cl.
C09D 11/00 (2006.01)
(52) U.S. Cl. ................ 523/160; 523/161; 524/317; 106/31.6; 106/31.86; 347/100
(58) Field of Classification Search ............. 523/160, 523/161; 106/31.13, 31.6; 347/100
See application file for complete search history.

(56) References Cited

U.S. PATENT DOCUMENTS 7,393,398 B2 * 7/2008 Sugita et al. .............. 106/31.66

FOREIGN PATENT DOCUMENTS

| JP | 8 73789 | 3/1996 |
|----|---------|--------|
| JP | 2000 141939 | 5/2000 |
| JP | 2001 164157 | 6/2001 |
| JP | 2002 302629 | 10/2002 |
| JP | 2005 15672 | 1/2005 |
| JP | 2005 60716 | 3/2005 |
| JP | 2005 105126 | 4/2005 |
| WO | 2004 007626 | 1/2004 |

* cited by examiner

Primary Examiner—David Wu
Assistant Examiner—Vu A Nguyen
(74) Attorney, Agent, or Firm—Oblon, Spivak, McClelland, Maier & Neustadt, L.L.P.

(57) ABSTRACT

Present invention relates to an inkjet ink used for a polyvinyl chloride resin sheet, wherein the inkjet ink comprises an organic solvent, a pigment and a vinyl chloride-vinyl acetate resin, the organic solvent is a mixed solvent comprising at least one compound selected from the group consisting of compounds represented by a formula (1) and compounds represented by a formula (2), together with a lactone compound, and the quantity of the lactone compound is within a range from 1 to 40% by weight relative to the total weight of the ink.

[Formula 1]

$$CH_3CO(OR^1)_mOR^2 \qquad (1)$$

(wherein, $R^1$ represents an ethylene group or propylene group, $R^2$ represents an alkyl group of 1 to 4 carbon atoms, and m represents an integer from 1 to 3)

[Formula 2]

$$CH_3CH(OH)COOR^3 \qquad (2)$$

(wherein, $R^3$ represents an alkyl group of 1 to 8 carbon atoms).

16 Claims, No Drawings

INKJET INK FOR POLYVINYL CHLORIDE RESIN SHEET

TECHNICAL FIELD

The present invention relates to an inkjet ink that exhibits excellent adhesion to polyvinyl chloride resin sheets.

BACKGROUND ART

Inks comprising a water-soluble dye such as an acid dye, direct dye or basic dye dissolved in a glycol-based solvent and water are currently widely used as inkjet inks. In order to ensure favorable ink stability, water-soluble dyes that have a high degree of solubility in water are most commonly used. As a result, inkjet recorded items generally exhibit poor water resistance, and if water is spilt on a recorded portion, the dye tends to bleed very easily.

In order to improve the water resistance and weather resistance, solvent-based inks in which a pigment is dispersed within a high boiling point solvent have been developed (for example, Japanese Patent Laid-Open No. 2001-164157 and Japanese Patent Laid-Open No. 2002-302629). However, with these types of inks, the solvent within the ink does not readily volatilize, meaning drying of the ink by evaporation is problematic. Accordingly, printing onto non-absorbent printing substrates such as polyvinyl chloride resin sheets is impossible.

Furthermore, methods that use of a ketone-based solvent such as cyclohexanone or isophorone, or a nitrogen-containing heterocyclic compound such as 2-pyrrolidone or N-methyl-2-pyrrolidone, dissolves the surface of the non-absorbent printing substrate, have recently been proposed thereby improves the fixing properties of the ink (for example, Japanese Patent Laid-Open No. 2005-60716 and Japanese Patent Laid-Open No. 2005-15672). However, because some of these solvents suffer from health and safety problems (they are considered Type 2 Organic Solvents (substances that are clearly hazardous to humans)), they require local ventilation equipment to deal with the problem of strong odors, as defined within the workplace environment assessment standards. Furthermore, because of the strong dissolution properties of these solvents, problems such as dissolution of the pigments and corrosion of the printing head materials may occur, meaning handling is also problematic.

Polyvinyl chloride resins are used almost exclusively as the inkjet printing substrates for outdoor advertising and the like because of their favorable levels of weather resistance, and resistance to chemicals such as alcohol resistance, gasoline resistance and detergent resistance. Vinyl chloride-vinyl acetate resins are used as the binder resins for inkjet inks used for printing onto polyvinyl chloride resin substrates as they exhibit favorable adhesion to the polyvinyl chloride resin substrate along with favorable weather resistance and chemical resistance. For example, inkjet inks prepared by dissolving a vinyl chloride-vinyl acetate resin in a polyoxyethylene glycol dialkyl ether are known (for example, WO2004/007626, pamphlet). However, because polyoxyethylene glycol dialkyl ethers exhibit poor solubility of vinyl chloride-vinyl acetate resins, the thixotropy of the inks is high, meaning the discharge stability is unsatisfactory. Furthermore, if an alcohol-modified vinyl chloride-vinyl acetate resin is used in order to improve the solubility, then the alcohol resistance of the ink coating deteriorates.

DISCLOSURE OF INVENTION

The present invention has an object of providing an inkjet ink for a polyvinyl chloride resin sheet that exhibits excellent adhesion.

The present invention relates to an inkjet ink used for a polyvinyl chloride resin sheet, wherein the inkjet ink comprises an organic solvent, a pigment and a vinyl chloride-vinyl acetate resin wherein the organic solvent is a mixed solvent comprising at least one compound selected from the group consisting of compounds represented by a formula (1) and compounds represented by a formula (2), together with a lactone compound, and the quantity of the lactone compound is within a range from 1 to 40% by weight relative to the total weight of the ink.

[Formula 1]

(wherein, $R^1$ represents an ethylene group or propylene group, $R^2$ represents an alkyl group of 1 to 4 carbon atoms, and m represents an integer from 1 to 3)

[Formula 2]

(wherein, $R^3$ represents an alkyl group of 1 to 8 carbon atoms)

The boiling point of the lactone compound at 1 atmosphere is preferably 150° C. or higher.

Furthermore, the organic solvent is preferably a mixed solvent comprising a compound represented by the formula (1) and a lactone compound.

The inkjet ink of the present invention may further comprise a hydrolysis prevention agent for the lactone compound.

Furthermore, the inkjet ink of the present invention may further comprise a dispersant.

The present disclosure relates to subject matter contained in Japanese Application 2005-173539 filed on Jun. 14, 2005; the disclosure of which is expressly incorporated herein by reference in its entirety.

BEST MODE FOR CARRYING OUT THE INVENTION

An inkjet ink of the present invention is used on a polyvinyl chloride resin sheet, and comprises an organic solvent, a pigment and a vinyl chloride-vinyl acetate resin, wherein the organic solvent is a mixed solvent comprising at least one compound selected from the group consisting of compounds represented by a formula (1) and compounds represented by a formula (2), together with a lactone compound, and the quantity of the lactone compound is within a range from 1 to 40% by weight relative to the total weight of the ink.

[Formula 3]

(wherein, $R^1$ represents an ethylene group or propylene group, $R^2$ represents an alkyl group of 1 to 4 carbon atoms, and m represents an integer from 1 to 3)

[Formula 4]

(wherein, $R^3$ represents an alkyl group of 1 to 8 carbon atoms)

The compounds represented by the formula (1) and the compounds represented by the formula (2) exhibit either absolutely no solubility, or substantially no solubility, of polyvinyl chloride resins. In the inkjet ink of the present invention, inclusion of the lactone compound in a quantity within a range from 1 to 40% by weight relative to the total weight of the ink is appropriate, and this quantity is preferably from 3 to 35% by weight. By adding the lactone compound to the ink, the ink slightly dissolves the surface of the polyvinyl chloride resin sheet that represents the print target, thereby markedly improving the ink adhesion. If the quantity of the lactone compound is too small, then the targeted adhesion is unobtainable, whereas if the quantity is too large, the surface of the polyvinyl chloride resin sheet is dissolved excessively, causing unevenness on the surface of the printed item and inviting a deterioration in the gloss.

The boiling point of the lactone compound at 1 atmosphere is preferably 150° C. or higher, and is even more preferably 200° C. or higher. If the boiling point at 1 atmosphere is lower than 150° C., then the drying of the lactone following printing is rapid, and the solvent may volatilize prior to dissolving the surface of the polyvinyl chloride resin sheet, meaning an adequate level of adhesion may be unobtainable. Higher boiling points present no fundamental problems, but in consideration of the performance of the drying device of the printer used, the boiling point of the ink is preferably not higher than 250° C.

Specific examples of the lactone compound include β-propiolactone, γ-butyrolactone, γ-valerolactone, γ-nonalactone, γ-undecalactone, δ-valerolactone, and ε-caprolactone. These compounds may be used either alone, or in combinations of two or more different compounds.

The compound represented by the formula (1) and the compound represented by the formula (2) are used as the principal solvents, and exhibit either absolutely no solubility, or substantially no solubility, of polyvinyl chloride resins.

[Formula 5]

$$CH_3CO(OR^1)_mOR^2 \quad (1)$$

(wherein, $R^1$ represents an ethylene group or propylene group, and $R^2$ represents an alkyl group of 1 to 4 carbon atoms)

[Formula 6]

$$CH_3CH(OH)COOR^3 \quad (2)$$

(wherein, $R^3$ represents an alkyl group of 1 to 8 carbon atoms)

In the present invention, a compound represented by the formula (1) or a compound represented by the formula (2) may be used alone, or a combination of both compounds may be used. The combined quantity of the compound represented by the formula (1) and the compound represented by the formula (2) preferably represents from 20 to 98% by weight of the total weight of the ink.

Examples of solvents corresponding with the formula (1) include glycol acetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate and dipropylene glycol monomethyl ether acetate. These solvents may be used either alone, or in combinations of two or more different solvents.

Examples of solvents corresponding with the formula (2) include methyl lactate, ethyl lactate, propyl lactate and butyl lactate. These solvents may be used either alone, or in combinations of two or more different solvents.

In addition to the solvents described above, other optional solvents may be added to the inkjet ink of the present invention, including glycols such as ethylene glycol, diethylene glycol, triethylene glycol, propylene glycol and dipropylene glycol; glycol ethers such as ethylene glycol monobutyl ether, propylene glycol monomethyl ether, propylene glycol monobutyl ether, diethylene glycol monoethyl ether, diethylene glycol diethyl ether, diethylene glycol monobutyl ether, diethylene glycol dibutyl ether, diethylene glycol methyl ethyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether and tripropylene glycol monomethyl ether; and glycol diacetates such as ethylene glycol diacetate and propylene glycol diacetate. These solvents may be used either alone, or in combinations of two or more different solvents. The quantity of these optional solvents within the ink preferably represents from 0 to 30% by weight of the total weight of the ink.

A variety of pigments used in printing inks and paints and the like can be used in the present invention. Examples of these types of pigments, expressed using the color index, include pigment black 7, pigment blue 15, 15:1, 15:3, 15:4, 15:6 and 60, pigment green 7 and 36, pigment red 9, 48, 49, 52, 53, 57, 97, 122, 149, 168, 177, 178, 179, 206, 207, 209, 242, 254 and 255, pigment violet 19, 23, 29, 30, 37, 40 and 50, pigment yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180 and 185, and pigment orange 36, 43, 51, 55, 59, 61, 71 and 74. Furthermore, all manner of carbon blacks including neutral, acidic and basic carbon blacks can also be used. The quantity of the pigment within the ink preferably represents from 0.1 to 10% by weight of the total weight of the ink.

In the present invention, in order to improve the adhesion to polyvinyl chloride resin sheets, a vinyl chloride-vinyl acetate resin is added to the inkjet ink. The weight average molecular weight of this vinyl chloride-vinyl acetate resin is preferably within a range from 10,000 to 50,000. The copolymerization ratio (weight ratio) between the vinyl chloride and the vinyl acetate is preferably within a range from vinyl chloride:vinyl acetate=80:20 to 95:5. The weight average molecular weight refers to a value measured by GPC (gel permeation chromatography) and referenced against polystyrene standards.

The vinyl chloride-vinyl acetate resin used in the present invention may be an alcohol-modified or acid-modified resin, but is preferably an unmodified resin. Specific examples of the vinyl chloride-vinyl acetate resin include the UCAR Solution Vinyl Resins VYHD, VYHH and VMCA manufactured by The Dow Chemical Company. The quantity of the vinyl chloride-vinyl acetate resin within the ink preferably represents from 0.1 to 10% by weight of the total weight of the ink.

Other resins besides the vinyl chloride-vinyl acetate resin may also be added to the inkjet ink of the present invention. Examples of these resins include acrylic resins, styrene-acrylic resins, styrene-maleic acid resins, rosin resins, rosin ester resins, ethylene-vinyl acetate resins, petroleum resins, coumarone-indene resins, terpene-phenol resins, phenolic resins, urethane resins, melamine resins, urea resins, epoxy resins, cellulose resins, xylene resins, alkyd resins, aliphatic hydrocarbon resins, butyral resins, maleic acid resins and fumaric acid resins.

In the present invention, a hydrolysis prevention agent for the lactone compound is preferably added to improve the storage stability of the ink. Carbodiimides can be used as this hydrolysis prevention agent. Examples of the hydrolysis prevention agent include bis(diisopropylphenyl)carbodiimide, 1,3-diisopropylcarbodiimide, dicyclohexylcarbodiimide, and polymers that contain carbodiimide groups. Specific examples include the products DIPC, DIC and DCC manufactured by Kawaguchi Chemical Industry Co., Ltd., Carbodilite V-01, V-02, V-02-L2, V-03, V-04, V-05, V-07, V-09, E-01 and E-02 manufactured by Nisshinbo Industries, Inc., and Stabaxol I, P, P-100, P-200, P-250 and 0115 manufactured by Rhein Chemie Group. The quantity of the hydrolysis prevention agent within the ink preferably represents from 0.01 to 5.0% by weight of the total weight of the ink.

In the present invention, a dispersant is preferably added to improve the dispersibility of the pigment and the storage stability of the ink. Examples of dispersants that can be used include hydroxyl group-containing carboxylate esters, salts of long-chain polyaminoamides and esters of high molecular weight acids, salts of high molecular weight polycarboxylic acids, salts of long-chain polyaminoamides and esters of polar acids, esters of high molecular weight unsaturated acids, high molecular weight copolymers, modified polyurethanes, modified polyacrylates, polyetherester-based anionic surfactants, salts of naphthalenesulfonic acid-formalin condensation products, salts of aromatic sulfonic acid-formalin condensation products, polyoxyethylene alkylphosphate esters, polyoxyethylene nonylphenyl ether, and stearylamine acetate.

Specific examples of suitable dispersants include products manufactured by BYK Chemie, such as "Anti-Terra-U (a polyaminoamide phosphate)", "Anti-Terra-203/204 (salts of high molecular weight polycarboxylic acids)", "Disperbyk-101 (a phosphate salt of a polyaminoamide and an acid ester), 107 (a hydroxyl group-containing carboxylate ester), 110 and 111 (copolymers that contain acid groups), 130 (a polyamide), 161, 162, 163, 164, 165, 166 and 170 (high molecular weight copolymers)", "Bykumen (an ester of a high molecular weight unsaturated acid)", "BYK-P104, P105 (high molecular weight unsaturated polycarboxylic acids", "P104S, 240S (systems containing a high molecular weight unsaturated polycarboxylic acid and silicon)", and "Lactimon (a combination of a long-chain amine, an unsaturated polycarboxylic acid, and silicon)".

Furthermore, products manufactured by Efka Chemicals include "Efka 44, 46, 47, 48, 49, 54, 63, 64, 65, 66, 71, 701, 764 and 766", "Efka Polymer 100 (a modified polyacrylate), 150 (an aliphatic modified polymer), 400, 401, 402, 403, 450, 451, 452 and 453 (modified polyacrylates), and 745 (a copper phthalocyanine system)"; products manufactured by Kyoeisha Chemical Co., Ltd., include "Florene TG-710 (a urethane oligomer)", "Flonone SH-290 and SP-1000", and "Polyflow No. 50E and No. 300 (acrylic copolymers)"; and products manufactured by Kusumoto Chemicals Ltd. include "Disparlon KS-860, 873SN and 874 (high molecular weight dispersants), #2150 (an aliphatic polyvalent carboxylic acid), and #7004 (a polyether ester)".

Moreover, products manufactured by Kao Corporation include "Demol RN and N (sodium salts of naphthalenesulfonic acid-formalin condensates), MS, C and SN-B (sodium salts of aromatic sulfonic acid-formalin condensates), and EP", "Homogenol L-18 (a polycarboxylic acid type polymer)", "Emalgen 920, 930, 931, 935, 950 and 985 (polyoxyethylene nonylphenyl ethers)", and "Acetamine 24 (a coconut amine acetate) and 86 (stearylamine acetate)"; products manufactured by Avecia Ltd. include "Solsperse 5000 (a phthalocyanine ammonium salt system), 13940 (a polyesteramine system), 17000 (a fatty acid amine system), and 24000"; products manufactured by Nikko Chemicals Co., Ltd. include "Nikol T106 (a polyoxyethylene sorbitan monooleate) and MYS-IEX (a polyoxyethylene monostearate), and Hexagline 4-0 (a hexaglyceryl tetraoleate)"; and products manufactured by Ajinomoto-Fine-Techno Co., Inc. include "Ajisper PB821 and PB822 (basic dispersants)". The quantity of the dispersant within the ink preferably represents from 0.1 to 10% by weight of the total weight of the ink.

Various other additives may also be added to the inkjet ink of the present invention, including plasticizers, surface modifiers, ultraviolet light prevention agents, light stabilizers, and antioxidants.

The inkjet ink of the present invention can be produced using conventional methods. In a sample method, the pigment is first dispersed in a single solvent or a mixed solvent using a paint shaker, sand mill, roll mill, or medialess disperser. In order to achieve dispersion of the pigment, either a dispersant or a resin may be used alone, or a combination of a dispersant and a resin may also be used. The resulting pigment dispersion is then mixed with a vinyl chloride-vinyl acetate resin and a hydrolysis prevention agent and the like, and is then diluted with the mixed solvent described above to complete preparation of the ink. Examples of the solvent used in the pigment dispersion include the compounds used in the mixed solvent described above. A solvent that exhibits absolutely no dissolution, or substantially no dissolution, of the polyvinyl chloride resin is preferred, and compounds represented by the formula (1) and compounds represented by the formula (2) are particularly desirable.

According to the present invention, an inkjet ink can be provided that exhibits excellent health and safety properties (and is not designated by Organic Solvent Ordinance), has minimal odor, does not require local ventilation equipment or the like, causes no corrosion of printer head materials, exhibits excellent discharge stability, and displays excellent adhesion to polyvinyl chloride resin sheets.

EXAMPLES

As follows is a description of specifics of the present invention based on a series of examples, although the present invention is in no way limited by these examples. In the examples, the units "parts" refer to "parts by weight".

First, a pigment dispersion A was prepared using the blend shown below. This dispersion was prepared by adding the pigment and the dispersant to the organic solvent, conducting stirring with a high-speed mixer until a uniform mixture was obtained, and then dispersing the thus obtained mill base in a horizontal sand mill for approximately one hour.

Lionol Blue FG-7400G (a phthalocyanine pigment, manufactured by Toyo Ink Manufacturing Co., Ltd.): 35.0 parts
Ajisper PB821 (a pigment dispersant manufactured by Ajinomoto-Fine-Techno Co., Inc.): 12.5 parts
Ethylene glycol monobutyl ether acetate: 52.5 parts In addition, a pigment dispersion B was prepared using the blend shown below. This dispersion was prepared by adding the pigment and the dispersant to the organic solvent, conducting stirring with a high-speed mixer until a uniform mixture was obtained, and then dispersing the thus obtained mill base in a horizontal sand mill for approximately 1.5 hours.

Yellow Pigment E4GN (a nickel complex azo pigment, manufactured by Bayer AG): 30 parts
Solsperse 17000 (a pigment dispersant manufactured by Avecia Ltd.): 16.5 parts
Ethylene glycol monobutyl ether acetate: 53.5 parts In addition, a pigment dispersion C was prepared using the blend shown below. This dispersion was prepared by adding the pigment and the dispersant to the organic solvent, conducting stirring with a high-speed mixer until a uniform mixture was obtained, and then dispersing the thus obtained mill base in a horizontal sand mill for approximately two hours.

Cromophtal Pink PT (a quinacridone pigment, manufactured by Ciba Specialty Chemicals Inc.): 32.0 parts
Solsperse 24000 (a pigment dispersant manufactured by Avecia Ltd.): 12.8 parts
Dipropylene glycol monoethyl ether: 55.2 parts Example 1

The pigment dispersion described above was converted to an ink using the formulation described below, thereby yielding an inkjet ink.

Pigment dispersion A: 11.4 parts
Vinyl chloride-vinyl acetate resin VYHD (manufactured by The Dow Chemical Company, weight average molecular weight: 22,000, copolymerization ratio (weight ratio) vinyl chloride:vinyl acetate=86:14): 4.5 parts
BYK-361N (an acrylic resin, manufactured by BYK Chemie): 0.5 parts
Ethylene glycol monobutyl ether acetate: 78.6 parts
γ-butyrolactone: 5.0 parts Example 2

The pigment dispersion described above was converted to an ink using the formulation described below, thereby yielding an inkjet ink.
Pigment dispersion B: 16.7 parts
Vinyl chloride-vinyl acetate resin VYHD: 3.5 parts
Ethylene glycol monobutyl ether acetate: 49.5 parts
ε-caprolactone: 30.0 parts
Stabaxol I (a polycarbodiimide, manufactured by Rhein Chemie Group): 0.3 parts Example 3

The pigment dispersion described above was converted to an ink using the formulation described below, thereby yielding an inkjet ink.
Pigment dispersion C: 12.5 parts
Vinyl chloride-vinyl acetate resin VYHD: 3.5 parts
Dipropylene glycol monoethyl ether: 39.0 parts
Diethylene glycol monoethyl ether acetate: 30.0 parts
γ-butyrolactone: 15.0 parts Example 4

The pigment dispersion described above was converted to an ink using the formulation described below, thereby yielding an inkjet ink.
Pigment dispersion A: 11.4 parts
Vinyl chloride-vinyl acetate resin VYHD: 4.0 parts
Butyl lactate: 54.6 parts
Propylene glycol monomethyl ether acetate: 10.0 parts
Dipropylene glycol monomethyl ether: 10.0 parts
ε-caprolactone: 10.0 parts Comparative Example 1

With the exception of removing the γ-butyrolactone from the blend formulation of the example 1, and replenishing the removed portion with ethylene glycol monobutyl ether acetate, the same method was used to form an ink, thereby yielding an inkjet ink.

Comparative Example 2

With the exception of removing the ε-caprolactone from the blend formulation of the example 2, and replenishing the removed portion with ethylene glycol monobutyl ether acetate, the same method was used to form an ink, thereby yielding an inkjet ink.

Comparative Example 3

With the exception of removing the vinyl chloride-vinyl acetate resin VYHD from the blend formulation of the example 3, and replenishing the removed portion with an acrylic resin Joncryl 67 (a styrene-α-methylstyrene-acrylic acid copolymer, manufactured by Johnson Polymer Co., Ltd.), the same method was used to form an ink, thereby yielding an inkjet ink.

Comparative Example 4

With the exception of removing the ε-caprolactone from the blend formulation of the example 4, and replenishing the removed portion with dipropylene glycol monoethyl ether, the same method was used to form an ink, thereby yielding an inkjet ink.

Comparative Example 5

The pigment dispersion described above was converted to an ink using the formulation described below, thereby yielding an inkjet ink.
Pigment dispersion C: 12.5 parts
Alcohol-modified vinyl chloride-vinyl acetate resin VROH (manufactured by The Dow Chemical Company): 6.5 parts
Propylene glycol diethyl ether: 76.0 parts
γ-butyrolactone: 5.0 parts Comparative Example 6

The pigment dispersion described above was converted to an ink using the formulation described below, but the resin solubility was poor, and an inkjet ink could not be obtained.
Pigment dispersion C: 12.5 parts
Vinyl chloride-vinyl acetate resin VYHD: 5.0 parts
Propylene glycol diethyl ether: 77.5 parts
γ-butyrolactone: 5.0 parts The inkjet inks obtained in the examples 1 to 4 exhibited excellent solubility of the vinyl chloride-vinyl acetate resin, and stable discharge properties were obtained.

The inkjet inks obtained in the examples 1 to 4 and the comparative examples 1 to 6 were each printed onto the surface of an untreated vinyl chloride resin sheet using an IP6500 printer (a wide format inkjet printer, manufactured by Seiko I Infotech Inc.), and the resulting printed item was evaluated for ink adhesion and film resistance in accordance with the methods described below.

(Adhesion: Rubbing Test)

The printed surface of the printed item was tested using a rubbing tester (model AB301, manufactured by Tester Sangyo Co., Ltd.), by rubbing a test cloth (kanakin No. 3) 50 times back and forth over the printed surface with a loading of 200 g, and then following rubbing, checking for the presence of ink exfoliation.

(Film Resistance: Alcohol Resistance Test)

The printed surface of the printed item was wiped 10 times back and forth with an ethanol-impregnated cotton-tipped swab, and a check was made for the presence of ink exfoliation.

As a result, the inks of the examples 1 to 4 showed no ink exfoliation from the polyvinyl chloride resin sheet in either the rubbing test or the alcohol resistance test, indicating favorable levels of both adhesion and film resistance. The inks of the comparative examples 1 to 4 showed ink exfoliation from the polyvinyl chloride resin sheet in both the rubbing test and the alcohol resistance test, with ink adhering to the test cloth or the cotton-tipped swab. The ink of the comparative example 5 suffered no ink exfoliation in the rubbing test, but in the alcohol resistance test, ink was removed from the polyvinyl chloride resin sheet and adhered to the cotton-tipped swab.

The invention claimed is:

1. An inkjet ink comprising:
an organic solvent, a pigment and a vinyl chloride-vinyl acetate resin, wherein
the organic solvent is a mixed solvent comprising a lactone compound and at least one compound selected from the group consisting of a compound represented by a formula (1) and a compound represented by a formula (2), and
a quantity of the lactone compound is within a range from 1 to 40% by weight relative to a total weight of the ink:

$$CH_3CO(OR^1)_mOR^2 \quad (1)$$

wherein $R^1$ represents an ethylene group or propylene group, $R^2$ represents an alkyl group of 1 to 4 carbon atoms, and m represents an integer from 1 to 3, $$CH_3CH(OH)COOR^3 \quad (2)$$

wherein $R^3$ represents an alkyl group of 1 to 8 carbon atoms.

2. The inkjet ink according to claim 1, wherein a boiling point of the lactone compound at 1 atmosphere is 150° C. or higher.

3. The inkjet ink according to claim 1, wherein the organic solvent is a mixed solvent comprising a compound represented by the formula (1) and the lactone compound.

4. The inkjet ink according to claim 1, further comprising a hydrolysis prevention agent.

5. The inkjet ink according to claim 1, further comprising a dispersant.

6. The inkjet ink according to claim 1, wherein the lactone compound is at least one selected from the group consisting of β-propiolactone, γ-butyrolactone, γ-valerolactone, γ-nonalactone, γ-undecalactone, δ-valerolactone, and ε-caprolactone.

7. The inkjet ink according to claim 1, wherein the organic solvent is a mixed solvent comprising a compound represented by the formula (2) and the lactone compound.

8. The inkjet ink according to claim 1, wherein the vinyl chloride-vinyl acetate resin has a weight average molecular weight of from 10,000 to 50,000.

9. The inkjet ink according to claim 1, wherein the copolymerization weight ratio between the vinyl chloride and the vinyl acetate of the vinyl chloride-vinyl acetate resin is from 80:20 to 95:5.

10. The inkjet ink according to claim 4, wherein the hydrolysis prevention agent is a carbodiimide.

11. The inkjet ink according to claim 10, wherein the carbodiimide is selected from the group consisting of bis(diisopropylphenyl)carbodiimide, 1,3-diisopropylcarbodiimide, dicyclohexylcarbodiimide, and a polymer that contains one or more carbodiimide groups.

12. The inkjet ink according to claim 4, wherein the hydrolysis prevention agent is present in an amount of from 0.01 to 5.0% by weight of the total weight of the ink.

13. The inkjet ink according to claim 5, wherein the dispersant is selected from the group consisting of a hydroxyl group-containing carboxylate ester, a salt of a long-chain polyaminoamide and an ester of a high molecular weight acid, a salt of a high molecular weight polycarboxylic acid, a salt of a long-chain polyaminoamide and an ester of a polar acid, an ester of a high molecular weight unsaturated acid, a high molecular weight copolymer, a modified polyurethane, a modified polyacrylate, a polyetherester-based anionic surfactant, a salt of a naphthalenesulfonic acid-formalin condensation product, a salt of an aromatic sulfonic acid-formalin condensation product, a polyoxyethylene alkylphosphate ester, a polyoxyethylene nonylphenyl ether, and stearylamine acetate.

14. The inkjet ink according to claim 5, wherein the dispersant is present in an amount of from 0.1 to 10% by weight of the total weight of the ink.

15. The inkjet ink according to claim 1, further comprising one or more resins selected from the group consisting of an acrylic resin, a styrene-acrylic resin, a styrene-maleic acid resin, a rosin resin, a rosin ester resin, an ethylene-vinyl acetate resin, a petroleum resin, a coumarone-indene resin, a terpene-phenol resin, a phenolic resin, an urethane resin, a melamine resin, an urea resin, an epoxy resin, a cellulose resin, a xylene resin, an alkyd resin, an aliphatic hydrocarbon resin, a butyral resin, a maleic acid resin and a fumaric acid resin.

16. The inkjet ink according to claim 1, further comprising one or more additives selected from the group consisting of a plasticizer, a surface modifier, an ultraviolet light prevention agent, a light stabilizer, and an antioxidant.

* * * * *